UNITED STATES PATENT OFFICE 2,005,347

DYEING COMPOSITION

Eugene A. Markush, Jersey City, N. J., assignor to Pharma Chemical Corporation, New York, N. Y., a corporation of New York No Drawing. Application October 9, 1933, Serial No. 692,823

8 Claims. (Cl. 8—6)

My invention relates to the stabilized diazoamino compounds of the heterocyclic series, having the general formula:

R—NH—N=N—A in which R represents the residue of a heterocyclic amine containing at least one solubilizing group such as carboxy groups and sulfo groups and A represents the residue of an aromatic compound containing no solubilizing group.

My invention refers also to methods for employing said diazoamino compounds in the dyeing and printing of textile fibers.

I have found that if the diazo compound produced by diazotizing an amine of the aromatic series be coupled, or combined, with a heterocyclic amine containing at least one solubilizing group such as a carboxy group, or a sulfo acid group, there results a compound which has excellent stability properties to the conditions of ordinary storage but which can be readily split up into the original diazo compound and the original heterocyclic amine when subjected to an acid treatment and as the diazo compound thus reproduced can be combined with coupling compounds to produce dyes, or colors, these new compounds of my invention possess valuable properties in the dyeing and printing of textile fibers.

It is evident that the employment of a coupling compound which does not contain a solubilizing group will result in a water-insoluble colored compound.

If, therefore, the textile fibers be padded, or treated otherwise, with such a coupling compound, the compounds of my invention be applied to the thus treated fibers, either by padding, printing, or otherwise, and this result be subjected to acid treatment, there will result a water-insoluble colored compound formed by the original diazotized amine and the coupling compound.

Due to the stability of my compounds even in the presence of a coupling compound in the absence of an acid or acidifying compound, the compound of my invention may be mixed with the coupling compounds, and when their employment is desired they may be applied to the fibers by padding, printing, or otherwise, if the thus treated fibers are subjected to an acid treatment, my compounds will be split up into the original diazotized amine and the original heterocyclic amine, and the former will combine with the coupling compound.

The use of my compounds when mixed with a coupling compound thus enables the production of colored effects upon textile fibers, with the elimination of several steps which are necessary when the results are obtained by separate applications of my compounds alone, preceded, or followed by, the employment of the coupling compounds.

Among the heterocyclic amines suitable for employment in my invention are amino-alpha carboxy-pyridine, amino-pyridine sulfonic acid, amino-alpha - carboxy-thiophen, amino - dicarboxy-pyridine, amino furoic acid and other heterocyclic compounds containing solubilizing groups. Among the amines of the aromatic series which are suitable in my process are O-chloraniline, p-chlor-aniline, 4-chlor-2-amino anisol, o-anisidine, p-nitro-o-toluidine, o-amino-diphenyl-ether, o-amino-diphenylether, dianisidine, and dichlor-aniline, and the esters, ethers and substituted compounds of amines of the aromatic series.

Among the coupling components suitable for my process are B-hydroxy-naphthoic anilid, B-hydroxy-naphthoic toluidid, phenyl-methyl pyrazolon, B-hydroxy-naphthoic-o-chlor-anilid, di-acetoacetic tolidid, B-hydroxy-naphthoic acid anilid, B - hydroxy - naphthoic acid-4-chlor-2-amino anisidid, di-B-hydroxy-naphthoic acid benzidid and 4-benzoylamino-alpha-naphthol.

The heterocyclic compounds suitable for my process must contain at least one solubilizing group and where more than one solubilizing group is present, they may be the same or different solubilizing members.

By coupling compounds I mean those compounds which will combine with the employed diazotized amine when present during the disassociation of my diazo-amino compounds by acid treatment, among which are the following as examples of my process:

Example 1

40 parts of 3-chloro 6-methoxy diazo amino benzol alpha sodium carboxy thiophen and 30 parts B-oxy-naphthoic acid ortho anisidid are mixed very intimately. The diazo amino compound is prepared by combining the diazonium solution of 3-chloro-6 methoxy amino benzol in molecular amount with an alkaline solution of amino alpha carboxy thiophen.

8 parts of the above mixture are dissolved in 40 parts water, 8 parts sodium hydrate 30 Bé. solution, 50 parts cello-solve and thickened with 120 parts starch—tragacanth gum. The paste is printed on the fibre in the usual manner, dried and developed in a steam ager in acetic acid vapors or in an acetic or formic acid bath with salt at 80° C. After hot soaping, rinsing and drying a clear bluish red shade is obtained.

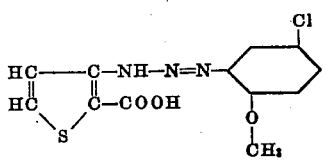

Example 2

20 parts of the amino compound of Example 1 are mixed with 11 parts phenyl-methyl-pyrazolon. When this powder is treated as in Example 1 a bright yellow shade is obtained.

Example 3

37 parts of the sodium salt of the diazo amino compound, obtained by combining in alkaline solution a molecular proportion of the diazonium of ortho-amino-diphenyl-ether with a slight excess of amino-dicarboxy-pyridine, with 30 parts of B-oxy naphthoic-acid-ortho-toluidid. When 8 parts of the above mixture is treated as in Example 1, there results a bright scarlet shade.

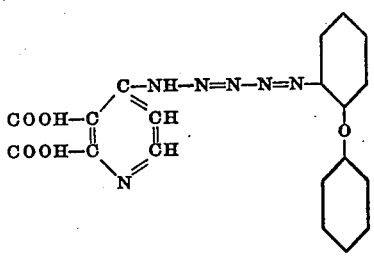

Example 4

A mixture prepared from 43 parts of diazoamino compound composed of tetrazotised dianisidine and amino-sulfo-pyridine and 28 parts of naphthol A. S. will yield a blue shade when applied on textile.

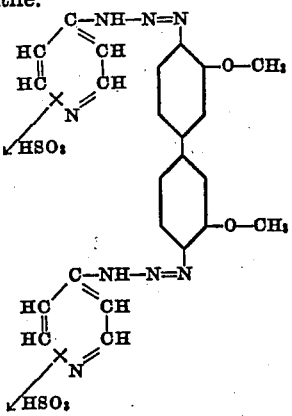

I do not limit myself to the particular compounds, quantities or steps of procedure mentioned, as these are given simply as a means for clearly describing my invention.

What I claim is:—

1. As a new composition of matter, a compound producible by combining a diazotized amine of the aromatic series containing no solubilizing group with a heterocyclic amine containing at least one solubilizing group, said diazoamino compound probably having the formula

R—NH—N=N—A in which R represents the residue of a heterocyclic amine containing at least one solubilizing group and A represents an aromatic radical, said diazoamino compound being mixed with a coupling compound.

2. As a new composition of matter, a compound producible by combining a diazotized amine of the aromatic series containing no solubilizing group with a heterocyclic amine containing at least one solubilizing group said diazoamino compound being split up into its original heterocyclic amine and original diazotized amine by acid treatments and probably having the formula

R—NH—N=N—A in which R represents the residue of a heterocyclic amine containing at least one solubilizing group and A represents an aromatic radical, said diazoamino compound being mixed with a coupling compound.

3. As a new composition of matter, a compound producible by combining a diazotized amine of the aromatic series containing no solubilizing group with amino-dicarboxy pyridine, said diazoamino compound having the formula:

R—NH—N=N—A in which R represents the residue of amino-dicarboxy pyridine, and A represents an aromatic radical, said diazo-amino compound being mixed with a coupling compound.

4. As a new composition of matter, a compound producible by combining a diazotized amine of the aromatic series containing no solubilizing group with amino-dicarboxy pyridine, said diazoamino compound having the formula:

R—NH—N=N—A in which R represents the residue of amino-dicarboxy pyridine, and A represents an aromatic radical, said diazo-amino compound being mixed with beta-oxy-naphthoic-acid-ortho-toluidid.

5. As a new composition of matter, a compound producible by combining diazotized ortho-amino-diphenyl-ether with a heterocyclic primary amine containing at least one solubilizing group, said diazo-amino compound having the formula:

R—NH—N=N—A in which R represents the residue of a heterocyclic primary amine containing at least one solubilizing group and A represents the radical of ortho-amino-diphenyl-ether, said diazo-amino compound being mixed with a coupling compound.

6. As a new composition of matter, a compound producible by combining diazotized ortho-amino-diphenyl-ether with amino-dicarboxyl-pyridine, said diazo-amino compound having the formula:

R—NH—N=N—A in which R represents the residue of amino-dicarboxyl-pyridine and A represents the radical of ortho-amino-diphenyl-ether, said diazo-amino compound being mixed with a coupling compound.

7. As a new composition of matter, a compound producible by combining diazotized ortho-amino-diphenyl-ether with a heterocyclic primary amine containing at least one solubilizing group, said diazo-amino compound having the formula:

R—NH—N=N—A in which R represents the residue of a heterocyclic primary amine containing at least one solubilizing group and A represents the radical of ortho-amino-diphenyl-ether, said diazo-amino compound being mixed with beta-oxy-naphthoic-acid-ortho-toluidine.

8. As a new composition of matter, a compound producible by combining diazotized ortho-amino-diphenyl-ether with amino-dicarboxyl-pyridine, said diazo-amino compound having the formula:

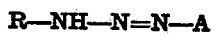

in which R represents the residue of amino-dicarboxyl-pyridine and A represents the radical of ortho-amino-diphenyl-ether, said diazo-amino compound being mixed with beta-oxy-naphthoic-acid-ortho-toluidine.

EUGENE A. MARKUSH.